United States Patent
Hoover

[19]

[11] Patent Number: 6,072,011

[45] Date of Patent: Jun. 6, 2000

[54] POLYCARBONATE-POLYSILOXANE BLOCK COPOLYMERS

[75] Inventor: James Franklin Hoover, Evansville, Ind.

[73] Assignee: General Electric Company, Schenectady, N.Y.

[21] Appl. No.: 08/346,325

[22] Filed: Nov. 29, 1994

Related U.S. Application Data

[63] Continuation of application No. 08/108,946, Aug. 18, 1993, abandoned, which is a continuation of application No. 07/724,022, Jul. 1, 1991, abandoned.

[51] Int. Cl.[7] .................................................. C08F 283/12
[52] U.S. Cl. ............................ 525/464; 525/104; 525/92; 528/26; 528/29; 524/162; 524/164; 524/588
[58] Field of Search ........................... 525/92, 104, 464; 528/26, 27; 524/162, 164, 588

[56] References Cited

U.S. PATENT DOCUMENTS

| | | | |
|---|---|---|---|
| 3,419,635 | 12/1968 | Vaughn | 528/29 |
| 4,391,935 | 7/1983 | Bialous et al. | 524/82 |
| 4,732,949 | 3/1988 | Paul et al. | 525/464 |
| 4,879,346 | 11/1989 | Bopp et al. | 525/146 |
| 4,912,165 | 3/1990 | Winfried et al. | 525/72 |
| 4,994,510 | 2/1991 | Naar | 524/162 |
| 5,025,074 | 6/1991 | Davis | 528/15 |

FOREIGN PATENT DOCUMENTS

| | | |
|---|---|---|
| 0382004 | 8/1990 | European Pat. Off. . |
| 0500087 | 8/1992 | European Pat. Off. . |

*Primary Examiner*—David W. Wu
*Assistant Examiner*—Ling-Siu Choi

[57] ABSTRACT

Block copolymers suitable as molding resins are provided having polycarbonate blocks and polysiloxane blocks of the structure

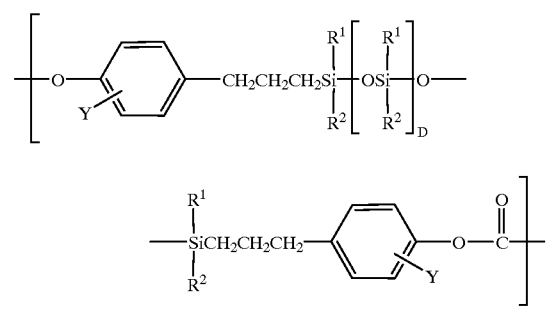

where $R^1$, $R^2$, Y and m are as defined herein, and where the weight percentage of blocks of polycarbonate blocks is from 92 to 96% and the weight percentage of siloxane from blocks of polysiloxane blocks is from 4 to 8%.

11 Claims, No Drawings

POLYCARBONATE-POLYSILOXANE BLOCK COPOLYMERS

This is a continuation of Ser. No. 08/108,946 filed on Aug. 18, 1993 now abandoned which is a continuation of Ser. No. 07/724,022 filed Jul. 1, 1991 now abandoned.

BACKGROUND OF THE INVENTION

1. Field of the Invention

This invention relates to thermoplastic ondensation polymers which are polycarbonate-polysiloxane block copolymers with enhanced properties such as solvent resistance, low temperature impact strength, improved processing and flame retardance, useful as thermoplastic molding resins.

2. Brief Description of Related Art

Aromatic carbonate polymers have found wide use as engineering thermoplastics, having inherent toughness and clarity. However, these polymers have generally had deficiencies such as inadequate solvent resistance, showing a tendency to craze or crack when exposed to many common solvents. Low temperature impact strength of carbonate polymers has also been considered to be in need of improvement. At low temperatures, brittle fractures are often a problem. Many variants of carbonate polymers have been tried in attempts to overcome these deficiencies.

Copolymers having polysiloxane and polycarbonate blocks are known. Representative of such polymers are those disclosed by Vaughn, U.S. Pat. Nos. 3,189,662 (June 1965) and 3,419,635 (December 1968).

The known polycarbonate-polysiloxane copolymers, while useful, also have several deficiencies. First, the polymers disclosed by Vaughn in U.S. Pat. No. 3,189,662 have aryloxysilicon structures which are hydrolytically unstable, as would be deduced from the publication dealing with this structure, by Rosenberg et al., J. Polymer Science, Polymer Chemistry Edition, 1982, 29, 1ff. Vaughn in U.S. Pat. No. 3,419,635 remedies this shortcoming by teaching the use of the more stable C-Si linkages in place of the aryloxysilicon linkages in organopolysiloxane-polycarbonate copolymers. Vaughn teaches that his polymers are useful in elastomeric applications, suitable for flexible windows, roofing, adhesives, denture bases, and other applications where non-elastomeric thermoplastics are not ordinarily used. In fact, Vaughn teaches the use of vulcanization to process his polymers in a rubber-like manner.

We have now found that within the broad range of polysiloxane-polycarbonate block copolymers taught by Vaughn, there is a class of compositions, in regard to the mode of attachment of the silicon to the phenolic ring, and with regard to the silicone loading and silicone block length, which possess advantageous physical and chemical properties, including improved processing properties, improved low temperature properties and improved solvent resistance, such that these copolymers are highly useful as thermoplastic molding resins.

SUMMARY OF THE INVENTION

The invention comprises polysiloxane-polycarbonate block copolymers with advantageous thermoplastic molding resin properties consisting essentially of: (1) polycarbonate blocks having recurring units of the formula:

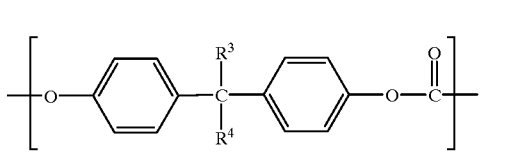

(I)

where $R^3$ and $R^4$ are each independently selected from hydrogen, hydrocarbyl or halogen-substituted hydrocarbyl, preferably methyl; and (2) polysiloxane blocks of the structure:

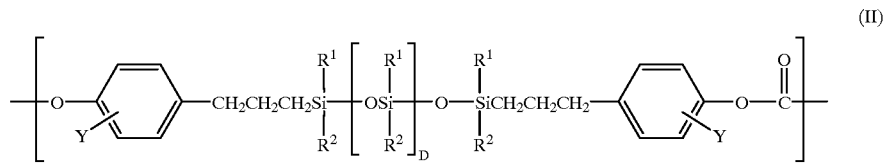

(II)

where $R^1$ and $R^2$ are each independently hydrogen, hydrocarbyl or halogen-substituted hydrocarbyl (preferably $R^1$ is methyl and $R^2$ is methyl or phenyl) and where D is an integer of from about 10 to about 120, preferably about 40–60; and Y is hydrogen, hydrocarbyl, hydrocarbyloxy or halogen, (preferably methoxy); and where the weight percentage of blocks of structure (1) is from about 96 to about 92.0% of the copolymers and the weight percentage of siloxane from the blocks of structure (2) is from about 4 to 8%.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonodecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like.

The term "alkylene" means the divalent moiety obtained on removal of two hydrogen atoms, each from a non-adjacent carbon atom of a parent hydrocarbon and includes alkylene of 3 to 15 carbon atoms, inclusive, such as 1,3-propylene, 1,4-butylene, 1,5-pentylene, 1,8-octylene, 1,10-decylene and the like.

The term "halogen-substituted hydrocarbyl" as used herein means the hydrocarbyl moiety as previously defined wherein one or more hydrogen atoms have been replaced with halogen (chlorine, bromine, iodine, fluorine).

DETAILED DESCRIPTION OF THE INVENTION

The block copolymers of the invention are prepared by the reaction of a carbonate forming precursor, such as phosgene, with a bisphenol of the formula:

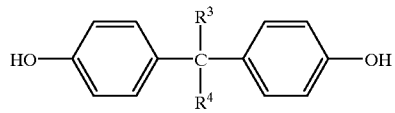

(III)

where $R^3$ and $R^4$ are as defined above; and a siloxane diol of the structure depicted by the formula:

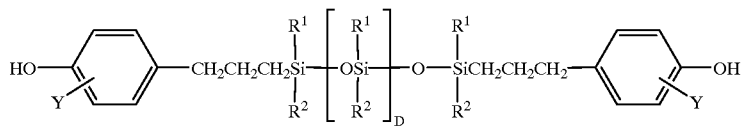

(IV)

where $R^1$ and $R^2$ Y and D are as defined above. A particularly preferred species of Formula (IV) is that in which $R^1$ and $R^2$ are methyl, Y is methoxy ortho to the phenolic hydroxyl, and D is about 45–55.

The bisphenol compounds of the formula (III) are represented by 2,2-bis-(4-hydroxyphenyl)propane (or bisphenol-A);

2,4'-dihydroxydiphenyl methane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexymethane;
1,2-bis-(4-hydroxyphenyl)-1,2-bis-(phenyl)propane;
2,2-bis-(4-hydroxyphenyl)-1-phenylpropane; and the like.

The siloxane diols (IV) depicted above as precursors of the siloxane block may be characterized as bisphenolsiloxanes. The preparation of these bisphenolsiloxanes is accomplished by the addition of a polydiorganosiloxane (V) to a phenol (VI) containing an alkenyl substituent, according to the schematic formula:

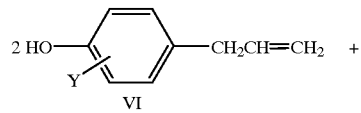

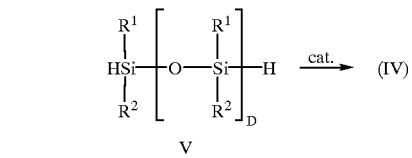

wherein $R^1$, $R^2$, Y and D are as defined above.

The essential features of the process are described by Vaughn, U.S. Pat. No. 3,419,635 (December 1968), which is incorporated by reference. For instance, the process is exemplified in example 8 of this Vaughn patent which describes the addition of a hydrogen-terminated polydimethylsiloxane to an allylphenol in the presence of a catalytic amount of chloroplatinic acid-alcohol complex at 90–115° C.

Particularly preferred polysiloxane blocks (a) are made from bisphenolpolysiloxanes (IV) where $R^1$ and $R^2$ are methyl and where Y is methoxy located ortho to the phenolic substituent. These are readily prepared by addition of a hydrogen-terminated polysiloxane to two molar equivalents of eugenol (4-allyl-2-methoxyphenol) in a reaction advantageously catalyzed by platinum or its compounds.

The hydrogen-terminated polysiloxanes of formula (V) are well-known compositions, being described along with methods for their preparation, in Vaughn U.S. Pat. Nos. 3,419,634 and 3,419,635.

The allylphenols of formula VI are also well known compounds, described along with methods for their preparation, by Tarbell, Chemical Reviews 27, 495ff (1940).

A particularly preferred compound of Formula (VI) is eugenol, 4-allyl-2-methoxyphenol, since it is readily available as a synthetic or as a natural product and affords a bisphenolpolysiloxane (IV) of favorable reactivity.

The conversion of the bisphenolpolysiloxane (V) and the bisphenol (III) to the block copolymer of the invention may be conducted by known processes for making polycarbonates, such as the methods set forth in U.S. Pat. Nos. 4,018,750 and 4,123,436 where a dihydric phenol is reacted with a carbonate precursor, advantageously phosgene; or by transesterification processes such as are disclosed in U.S. Pat. No. 3,154,008, as well as other processes known to those skilled in the art. The preferred method of preparing polycarbonate resins comprises the interfacial polymerization of the dihydric phenols with a carbonate precursor, advantageously phosgene.

The block copolymers of the invention may be employed without further admixture, or after admixture with various additives. Such additives are known to the art of plastics compounding, and may include for example fillers (such as clay or talc), reinforcing agents (such as glass fibers), impact modifiers, other resins, antistats, plasticizers, flow promoters and other processing aids, stabilizers, colorants, mold release agents, other flame retardants, ultraviolet screening agents, and the like.

An important feature of the compositions of the invention is their ability to produce articles which display good flame ignition resistance and flame retardancy, while at the same time having good impact strength. It has hitherto been difficult to achieve both desirable properties at the same time without an undesirable degree of compromise. For the purpose of achieving an enhanced degree of flame retardancy, the block copolymers of the invention may be compounded by blending with alkali metal or alkaline earth metal salts of organic sulfonates which may be halogenated, with polycarbonates made with halogenated bisphenols, with halogenated organic molecules, organophosphorus compounds, halogen-phosphorus compounds, polytetrafluoroethylene, fumed silica, and other materials which provide ignition resistance (or flame retardancy) to the resin composition and to molded articles made therefrom. Specially preferred compositions of the invention are those that contain an effective flame retardant amount, typically from 0.3% of 0.06% sulfonate or 0.5 to 2.0% halogen flame retardant.

Preparation 1

Representative preparation of eugenol capped polydimethylsiloxane fluid: Octamethylcyclotetrasiloxane (8.3 kg, 28.0 moles), tetramethyldisiloxane (330 g, 2.46 moles) and Filtrol 20 (86 g, 1% by weight, Harshaw/Filtrol Clay Products) were combined in a 12 L flask and heated to 45 C for 2 hours. The temperature was raised to 100 C and the mixture was rapidly agitated for 5 hours. The mixture was allowed to cool then filtered through a plug of Celite filtering aid. To the crude product was added a mixture of eugenol (774 g, 4.72 moles) and Karstedt's platinum catalyst (1.57 g, 10 ppm Pt) at a rate of 40 g/minute. Reaction completion was monitored by the disappearance of the siloxane hydrogen in the FTIR spectrum. The reaction product was stripped of volatiles using a falling thin film evaporator operating at 200 C and 1.5 torr. The isolated material was a light brown oil with a viscosity of 100 cstokes at 25 C and a degree of polymerization of 49 siloxane units. The material was used without further purification.

Preparation 2

Representative preparation of the copolymer compositions: Bisphenol-A (90.7 kg, 398 moles), the D49 eugenol capped polydimethylsiloxane fluid (5.9 kg, 1.5 moles, 5 percent by weight siloxane), triethylamine (1.1 L), phenol (1.3 kg, 13.9 mole) and sodium gluconate (150 g) were combined with water (200 L) and dichloromethane (250 L) in the 1000 L reactor. The biphasic mixture was stirred vigorously and brought to pH 10 by the addition of 50% aqueous sodium hydroxide solution. Phosgene (45.3 kg, 458 moles) was added over the course of 30 minutes with the reaction pH maintained in the range of 10.0 to 10.5. After purging the reaction mixture with nitrogen, additional dichloromethane (200 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The resin was isolated as white granules (95 kg) by steam precipitation from the dichloromethane solution. The material was characterized by standard analytical methods. IV 0.47; Gel Permeation Chromatography (polystyrene standard using a K factor to polycarbonate molecular weights) Mw 26808, Mn 12479, Disp 2.15; Melt flow 6.5 g/10 min. Siloxane content by 1H NMR was 5 wt %. By similar method, various other resin compositions were prepared and evaluated. Materials were compounded with a phosphite stabilizer (0.05 wt. %) and tumbled in a stainless steel can prior to extrusion on a Werner and Pfleiderer 28 or 30 mm co-rotating twin screw extruder operating at 550 to 570 F barrel temperatures. Test specimens were prepared by injection molding at 570 F melt temperature and 180 F mold temperature. Notched IZOD impact of single gated bars and unnotched IZOD impact of double gated bars were determined according to ASTM D-256. Flexural yield and flexural modulus were determined according to ASTM D-790. Tensile yield, tensile break and tensile elongation were determined according to ASTM D-638. Melt flow rating was determined by modified ASTM D-1238. Ignition resistance was determined by UL94 test. The following discussion and data describes the experimental approach used to define the scope of the eugenol capped polysiloxane bisphenol-A copolycarbonates. A range of copolymer compositions was investigated in order to fully understand physical property relationship to molecular composition. A variety of copolymers were synthesized and evaluated based on analysis of the resins and testing of specimens molded from the resins. A matrix of experiments was based on the Box-Behnken experimental model where three independent variables were assessed for contribution to properties in a limited number of experiments. Three independent variables investigated were siloxane block length (D), absolute loading of the dimethylsiloxane unit (($CH_3$)$_2$SiO) and amount of chain terminating monophenol. Copolymers were prepared with siloxane repeat units of D=21, 49 and 97. Absolute loading of the siloxane unit was evaluated at 2, 5 and 8 percent by weight. Chain terminating monophenol levels of 2.0, 2.5 and 3.0 mole percent of the repeating polymer units were evaluated. In order to efficiently evaluate the three independent variables, an experimental matrix was comprised of a cube with one of the independent variables at each axis with experimental compositions defined by the midpoint of each edge as well as replicated compositions for the center of the cube. The materials were prepared, extruded and molded as described above. The table below describes the materials prepared.

| Entry | % siloxane | D length | % phenol | melt flow (1) | DG IZOD (2) | 125 NI (3) | 250 NI (4) |
|---|---|---|---|---|---|---|---|
| 1 | 2 | 21 | 2.5 | 4.5 | 49* | (−30) 15* | (0) 3† |
| 2 | 5 | 21 | 2.0 | 3.0 | 33* | (−40) 9* | (0) 4† |
| 3 | 5 | 21 | 3.0 | 5.0 | 36* | (−30) 14* | (0) 4† |
| 4 | 8 | 21 | 2.5 | 4.0 | 27* | (−50) 11* | (−20) 8* |
| 5 | 2 | 49 | 2.5 | 3.5 | 37* | (−40) 11* | (−10) 4† |

-continued

| Entry | % siloxane | D length | % phenol | melt flow (1) | DG IZOD (2) | 125 NI (3) | 250 NI (4) |
|---|---|---|---|---|---|---|---|
| 6  | 2 | 49 | 3.0 | 5.0 | 48* | (−40) 13* | (−10) 4† |
| 7  | 5 | 49 | 2.5 | 4.0 | 34* | (−60) 11* | (−20) 8* |
| 8  | 8 | 49 | 2.0 | 2.0 | 27* | (−60) 7*  | (−40) 6* |
| 9  | 5 | 49 | 2.5 | 3.5 | 35* | (−60) 11* | (−20) 11* |
| 10 | 8 | 49 | 3.0 | 4.0 | 28* | (−70) 10* | (−50) 7* |
| 11 | 5 | 97 | 2.0 | 3.0 | 33* | (−40) 9*  | (−20) 9* |
| 12 | 2 | 97 | 2.5 | 4.0 | 49* | (−30) 14* | (0) 9* |
| 13 | 8 | 97 | 2.5 | 4.0 | 26* | (−70) 9*  | (−60) 7* |
| 14 | 5 | 97 | 3.0 | 5.0 | 33* | (−70) 9*  | (−50) 6* |
| 15 | 0 | —  | —   | 4.0 | —   | (−40) 9*  | (20) 3† |

Legend:
(1) g/10 min at 300 C;
(2) ASTM D-256 IZOD impact strength of 125 mil thickness double gated bars in ft-lbs/in;
(3) ASTM D-256 notched IZOD impact strength of 125 mil thickness bars at lowest temperature ductile failure (C) in ft- lbs/in;
(4) ASTM D-256 notched IZOD impact strength of 250 mil thickness at lowest temperature ductile failure (° C.;
*indicates ductile failure;
† indicates brittle failure) in ft-lbs/in.

From the table it is shown that the knit line strength in the double gated bar was highest for lower levels of siloxane and lowest for higher levels of siloxane with no correlation to D length. Entry 15 provides notched IZOD impact data for homopolycarbonate within the melt flow range of the synthesized copolymers. IZOD impact data correlates well with toughness of molded end-use articles. No distinct correlations were observed for changes in the chain terminating monophenol at the melt flow ratings investigated. From the experimental matrix it is seen that for any given D length at 2 percent siloxane loading there was no distinct difference in low temperature impact performance. With the exception of the D equal to 21 compositions, increasing the siloxane loading within a given D length dramatically increased the low temperature notched IZOD impact performance. All compositions investigated with D equal to 21 were inferior to the remaining siloxane copolymers. The compositions with D equal to 49 or 97 at 5 or 8 percent overall siloxane loading showed excellent toughness by notched IZOD impact strength measurement. Surprisingly, larger articles molded using the D equal to 97 compositions at 5 or 8 percent siloxane showed poor part aesthetics compared to the D equal to 49 compositions. The optimum composition with regard to notched IZOD impact strength, knit line strength and part appearance is conclusively those formed about the center of the experimental matrix where D equals about 50 and the overall siloxane loading is about 5 percent.

The following examples are intended to further demonstrate the usefulness of the optimized copolymer composition and are not intended to limit possible compositions and properties.

EXAMPLE 1

Control composition, 16, was prepared: 91.4 parts LEXAN 140 grade polycarbonate resin (GE Plastics), 4.3 parts B56 impact modifier (a methyl methacrylate butadiene styrene core shell copolymer from Kaneka Texas Corporation), 4.3 parts of a copolycarbonate of bisphenol-A and 43 weight percent bisphenol-A capped polydimethylsiloxane with a degree of polymerization of 10 (made by GE in accordance with Merritt, U.S. Pat. No. 3,832,419), 0.45 parts potassium diphenylsulfone-3-sulfonate (flame retardant), 2.0 parts TIONA RCL-69 titanium dioxide (made by SCM) and appropriate stabilizers.

A composition of the present invention, 17, was prepared: 100 parts of a copolycarbonate of bisphenol-A and eugenol capped polydimethylsiloxane D equal to 50 with 5 weight percent siloxane, 0.45 parts potassium diphenylsulfone-3-sulfonate (flame retardant), 2.0 parts TIONA RCL-69 titanium dioxide (made by SCM) and appropriate stabilizers.

The materials were compounded, extruded and molded as described above:

| Property | Control 16 | Invention 17 |
|---|---|---|
| Melt flow rating (g/10 min) | 11 | 9 |
| Part melt flow rating (g/10 min) | 12 | 10 |
| Tensile @ break (psi) | 9400 | 8300 |
| Tensile @ yield (psi) | 8200 | 8500 |
| Tensile elongation (%) | 104 | 76 |
| Flex modulus (psi) | 302300 | 308300 |
| Flex yield (psi) | 11900 | 12600 |
| 125 mil notched IZOD (ft-lbs/in) | 13* | 14* |
| 125 mil notched IZOD @ −50 C (ft-lbs/in) | 11* | 10* |
| 250 mil notched IZOD (ft-lbs/in) | 12* | 11* |
| UL94 @ 125 mil (rating) | B | V0 |
| Average flame out time (sec) | 18 | 4 |

(*indicates ductile failure)

These data show that at approximately similar impact performance, the ignition resistance as measured by UL94 is significantly better for the composition of the invention than the control compositions which use standard methods for impact modification.

EXAMPLE 2

Control composition, 18, was prepared: 100 parts LEXAN 140 grade polycarbonate resin (GE Plastics), 0.6 parts sodium 2,4,5-trichlorobenzenesulfonate (flame retardant), 0.60 parts blend of polytetrafluoroethylene (20%) with bisphenol-A polycarbonate (80%), 2.0 parts TIONA RCL-69 titanium dioxide (made by SCM) and appropriate stabilizers.

A composition of the present invention, 19, was prepared: 100 parts of a copolycarbonate of bisphenol-A and eugenol capped polydimethylsiloxane D equal to 50 with 5 weight percent siloxane, 0.6 parts sodium 2,4,5-trichlorobenzenesulfonate (flame retardant), 0.60 parts blend of polytetrafluoroethylene (20%) with bisphenol-A polycarbonate (80%), 2.0 parts TIONA RCL-69 titanium dioxide (made by SCM) and appropriate stabilizers.

The materials were compounded, extruded and molded as described above:

| Property | Control 18 | Invention 19 |
|---|---|---|
| Melt flow rating (g/10 min) | 9 | 9 |
| Part melt flow rating (g/10 min) | 8 | 10 |
| Tensile @ break (psi) | 10300 | 7600 |
| Tensile @ yield (psi) | 9400 | 8400 |
| Tensile elongation (%) | 99 | 58 |
| Flex modulus (psi) | 331400 | 282400 |
| Flex yield | 14000 | 11700 |
| 125 mil notched IZOD (ft-lbs/in) | 15* | 13* |
| 125 mil notched IZOD @ −30° C. (ft-lbs/in) | 2† | 6† |
| 250 mil notched IZOD (ft-lbs/in) | 2† | 8† |
| UL94 @ 60 mil (rating) | V0 | V0 |
| average flame out time (sec) | 2 | 3 |
| 5V @ 125 mil (rating) | failed | passed |

(*indicates ductile failure;
† indicates brittle failure)

These data show that at approximately comparable ignition resistance as measured by UL94, the composition of the invention was substantially superior in impact performance to the control composition using standard flame retardant techniques.

EXAMPLE 3

Control composition, 20, was prepared: 90 parts LEXAN 140 grade polycarbonate resin (GE Plastics), 10 parts chopped glass fibers (Owens Corning Fiberglass 415), 0.45 parts potassium diphenylsulfone-3-sulfonate (flame retardant), 2.0 parts TIONA RCL-69 titanium dioxide (made by SCM) and appropriate stabilizers.

A composition of the present invention, 21, was prepared: 90 parts of a copolycarbonate of bisphenol-A and eugenol capped polydimethylsiloxane D equal to 50 with 5 weight percent siloxane, 10 parts chopped glass fibers (OCF 415), 0.45 parts potassium diphenylsulfone-3-sulfonate (flame retardant), 2.0 parts TIONA RCL-69 titanium dioxide (made by SCM) and appropriate stabilizers.

The materials were compounded, extruded and molded as described above:

| Property | Control 20 | Invention 21 |
|---|---|---|
| Melt flow rating (g/10 min) | 8 | 7 |
| Part melt flow rating (g/10 min) | 8 | 7 |
| Tensile @ break (psi) | 7100 | 6400 |
| Tensile @ yield (psi) | 8800 | 7500 |
| Tensile elongation (%) | 15 | 12 |
| Flex modulus (psi) | 397100 | 353000 |
| Flex yield | 14100 | 12200 |
| 125 mil notched IZOD (ft-lbs/in) | 2† | 5* |
| 250 mil notched IZOD (ft-lbs/in) | 1† | 3* |
| UL94 @ 90 mil (rating) | V2 | V0 |
| 5V @ 125 mil (rating) | fail | pass |

(*indicates ductile failure;
†indicates brittle failure)

These data indicate that at equal glass fiber loading for dimensional reinforcement the compositions of the invention show superior ignition resistance and impact performance.

What is claimed is:

1. Polysiloxane-polycarbonate block copolymers, which comprise:

(1) polycarbonate blocks with recurring units of the formula:

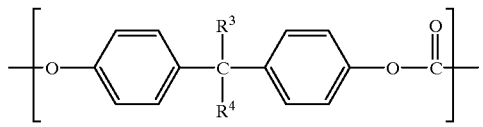

where $R^3$ and $R^4$ are each independently selected from hydrogen, hydrocarbyl or halogen-substituted hydrocarbyl; and (2) interrupting polysiloxane blocks of the formula:

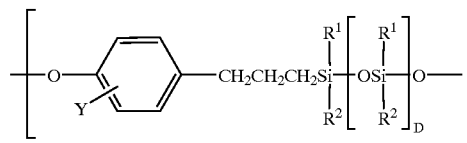

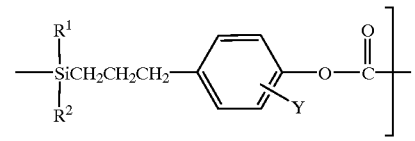

where $R^1$ and $R^2$ are each independently selected from hydrogen, hydrocarbyl or halogen-substituted hydrocarbyl, D is an integer of from about 30 to about 70, and Y is selected from hydrogen, hydrocarbyl, hydrocarbyloxy or halogen; and wherein the weight percentage of said polycarbonate blocks (1) is from about 92 to about 96%, and the weight percentage of siloxane from said polysiloxane blocks (2) is from about 4 to 8%.

2. The copolymers of claim 1 wherein $R^3$ and $R^4$ are methyl.

3. The copolymers of claim 1 wherein $R^1$ and $R^2$ are methyl.

4. The copolymers of claim 1 wherein D is about 40–60.

5. The copolymer of claim 1 wherein D is about 50 and the siloxane weight percentage is about 5.

6. A flame retardant thermoplastic composition of high impact strength which comprises:

(I) a polysiloxane-polycarbonate block copolymer comprising:

(1) a polycarbonate block of the formula:

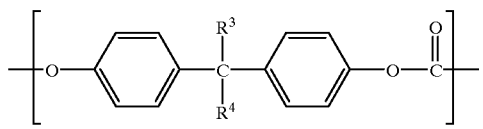

where $R^3$ and $R^4$ are selected from hydrogen, hydrocarbyl or halogen-substituted hydrocarbyl; and (2) a polysiloxane block of the formula:

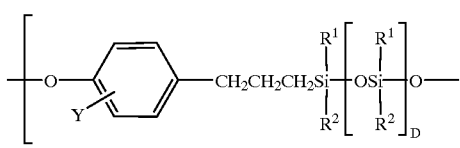

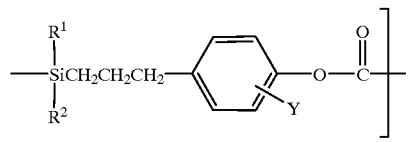

where $R^1$ and $R^2$ are each independently selected from hydrogen, hydrocarbyl or halogen-substituted hydrocarbyl, D is from about 30 to about 70, and Y is selected from hydrogen, hydrocarbyl, hydrocarbyloxy or halogen; and wherein the weight percentage of said polycarbonate blocks (1) is from about 92 to about 96%, and the weight percentage of siloxane from said polysiloxane blocks (2) is from about 4 to about 8%; and (II) an effective amount of a flame retardant selected from the group consisting of a sulfonate, a halogenated compound, polytetrafluoroethylene and fumed silica.

7. The composition of claim 6 wherein said flame retardant is sodium trichlorobenzenesulfonate.

8. The composition of claim 6 wherein said flame retardant is potassium diphenylsulfone-3-sulfonate.

9. The composition of claim 6 wherein D is about 50 and the siloxane weight percentage is about 5.

10. A flame retardant thermoplastic composition of high impact strength consisting essentially of:
(I) a polysiloxane-polycarbonate block copolymer comprising:
(1) a polycarbonate block of the formula:

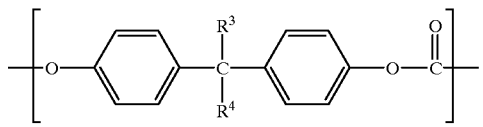

where $R^3$ and $R^4$ are selected from hydrogen, hydrocarbyl or halogen-substituted hydrocarbyl; and
(2) a polysiloxane block of the formula:

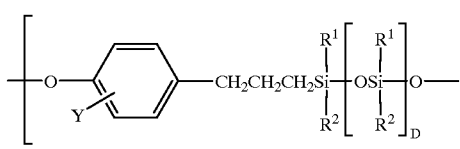

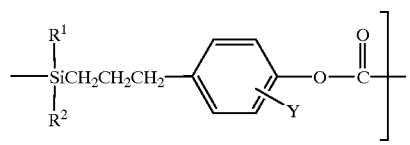

where $R^1$ and $R^2$ are each independently selected from hydrogen, hydrocarbyl or halogen-substituted hydrocarbyl, D is from about 30 to about 70, and Y is selected from hydrogen, hydrocarbyl, hydrocarbyloxy or halogen; and wherein the weight percentage of said polycarbonate blocks (1) is from about 92 to about 96%, and the weight percentage of siloxane from said polysiloxane blocks (2) is from about 4 to about 8%; and (II) an effective amount of a flame retardant selected from the group consisting of a sulfonate, a halogenated compound, polytetrafluoroethylene and fumed silica.

11. A thermoplastic composition having high impact strength which comprises:
(I) a polysiloxane-polycarbonate block copolymer comprising:
(1) a polyearbonate block of the formula:

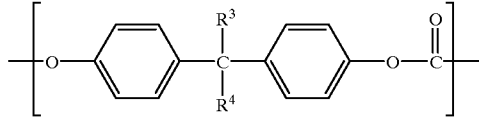

where $R^3$ and $R^4$ are selected from hydrogen, hydrocarbyl or halogen-substituted hydrocarbyl; and
(2) a polysiloxane block of the formula:

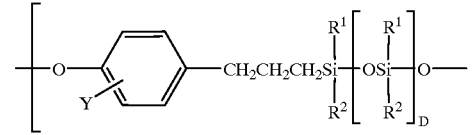

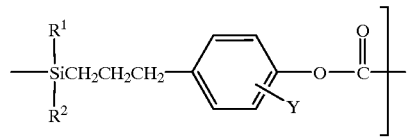

where $R^1$ and $R^2$ are each independently selected from hydrogen, hydrocarbyl or halogen-substituted hydrocarbyl, and Y is selected from hydrogen, hydrocarbyl, hydrocarbyloxy or halogen; and wherein D is an integer and the combination of D and the weight percentage of said polycarbonate blocks (1) and said polysiloxane blocks (2) are selected such that the thermoplastic composition has a ductile notched izod failure at 0° C. or less as tested by the ASTM D-256 impact test at a thickness of 250 millimeters.

* * * * *

UNITED STATES PATENT AND TRADEMARK OFFICE
CERTIFICATE OF CORRECTION

| | |
|---|---|
| PATENT NO. | : 6,072,011 |
| APPLICATION NO. | : 08/346325 |
| DATED | : June 6, 2000 |
| INVENTOR(S) | : James Franklin Hoover |

Page 1 of 1

It is certified that error appears in the above-identified patent and that said Letters Patent is hereby corrected as shown below:

Column 12, claim 11, lines 59 to 60, and should be corrected as follows:

"0°C. or less as tested by the ASTM D-256 impact test at a thickness of 250 millimeters" should read -- 0°C. or less as tested by the ASTM D-256 impact test at a thickness of 250 mils --.

Signed and Sealed this

Nineteenth Day of May, 2009

JOHN DOLL
*Acting Director of the United States Patent and Trademark Office*